(12) United States Patent
Peterson et al.

(10) Patent No.: US 8,706,275 B2
(45) Date of Patent: Apr. 22, 2014

(54) SYSTEMS AND METHODS FOR APPLICATION SOUND MANAGEMENT

(75) Inventors: Nathan J. Peterson, Raleigh, NC (US); Arnold S. Weksler, Raleigh, NC (US); Rod D. Waltermann, Rougemont, CA (US); Scott E. Kelso, Cary, NC (US); John C. Mese, Cary, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 665 days.

(21) Appl. No.: 12/703,277

(22) Filed: Feb. 10, 2010

(65) Prior Publication Data
US 2011/0196520 A1    Aug. 11, 2011

(51) Int. Cl.
*G06F 17/00* (2006.01)

(52) U.S. Cl.
USPC ............... 700/94; 345/1.1; 715/727; 381/104

(58) Field of Classification Search
USPC ............... 700/94; 345/1.3, 1.1; 715/716, 727, 715/761, 803; 381/119, 104
See application file for complete search history.

(56) References Cited

U.S. PATENT DOCUMENTS

| 5,740,436 | A  | * | 4/1998  | Davis et al. ..................... 713/1 |
| 6,081,266 | A  | * | 6/2000  | Sciammarella ............... 715/727 |
| 6,647,119 | B1 | * | 11/2003 | Slezak ........................... 381/17 |
| 7,602,924 | B2 | * | 10/2009 | Kleen ............................ 381/61 |
| 8,136,040 | B2 | * | 3/2012  | Fleming ....................... 715/716 |
| 2009/0222729 | A1 | * | 9/2009 | Deshpande ................... 715/716 |

* cited by examiner

*Primary Examiner* — Xu Mei
*Assistant Examiner* — Con P Tran
(74) *Attorney, Agent, or Firm* — Ference & Associates LLC

(57) ABSTRACT

Embodiments of the invention provide systems, methods, apparatuses and program products configured to intelligently manage sound options for applications of a computer system based on display device characteristics. Various embodiments of the invention are particularly well suited for optimizing the sound options of two or more applications running on two or more display screens of the computer system simultaneously.

20 Claims, 4 Drawing Sheets

SYSTEMS AND METHODS FOR APPLICATION SOUND MANAGEMENT

BACKGROUND

The subject matter presented herein generally relates to sound management for applications of a computer system. A user is enabled to have many applications running on a computer system at any given time. Managing the sound options for these many applications individually is cumbersome, prompting many users to forgo differentially managing sound options for the various applications.

BRIEF SUMMARY

Embodiments of the invention provide systems, methods, apparatuses and program products configured to intelligently manage sound options for applications of a computer system based on display device characteristics. Various embodiments of the invention are particularly well suited for optimizing the sound options of two or more applications running simultaneously on two or more different display screens of the computer system.

In summary, one aspect of the invention provides an apparatus comprising: one or more processors; and a program storage device tangibly embodying a program of instructions executable by the one or more processors, the program of instructions comprising: computer readable program code configured to provide one or more sound profiles for one or more applications running on the apparatus; and computer readable program code configured to apply the one or more sound profiles to one or more applications configured for output to different display devices.

Another aspect of the invention provides a method comprising: utilizing one or more processors of an apparatus to execute a program of instructions tangibly embodied on one or more program storage devices, the program of instructions comprising: computer readable program code configured to provide one or more sound profiles for one or more applications running on the apparatus; and computer readable program code configured to apply the one or more sound profiles to one or more applications configured for output to different display devices.

A further aspect of the invention provides a computer program product comprising: a computer readable storage medium having computer readable program code embodied therewith, the computer readable program code comprising: computer readable program code configured to provide one or more sound profiles for one or more applications running on an apparatus; and computer readable program code configured to apply the one or more sound profiles to one or more applications configured for output to different display devices.

For a better understanding of the embodiments of the invention, together with other and further features and advantages thereof, reference is made to the following description, taken in conjunction with the accompanying drawings, and the scope of the claimed embodiments of the invention will be pointed out in the appended claims.

DETAILED DESCRIPTION

Figure 1:
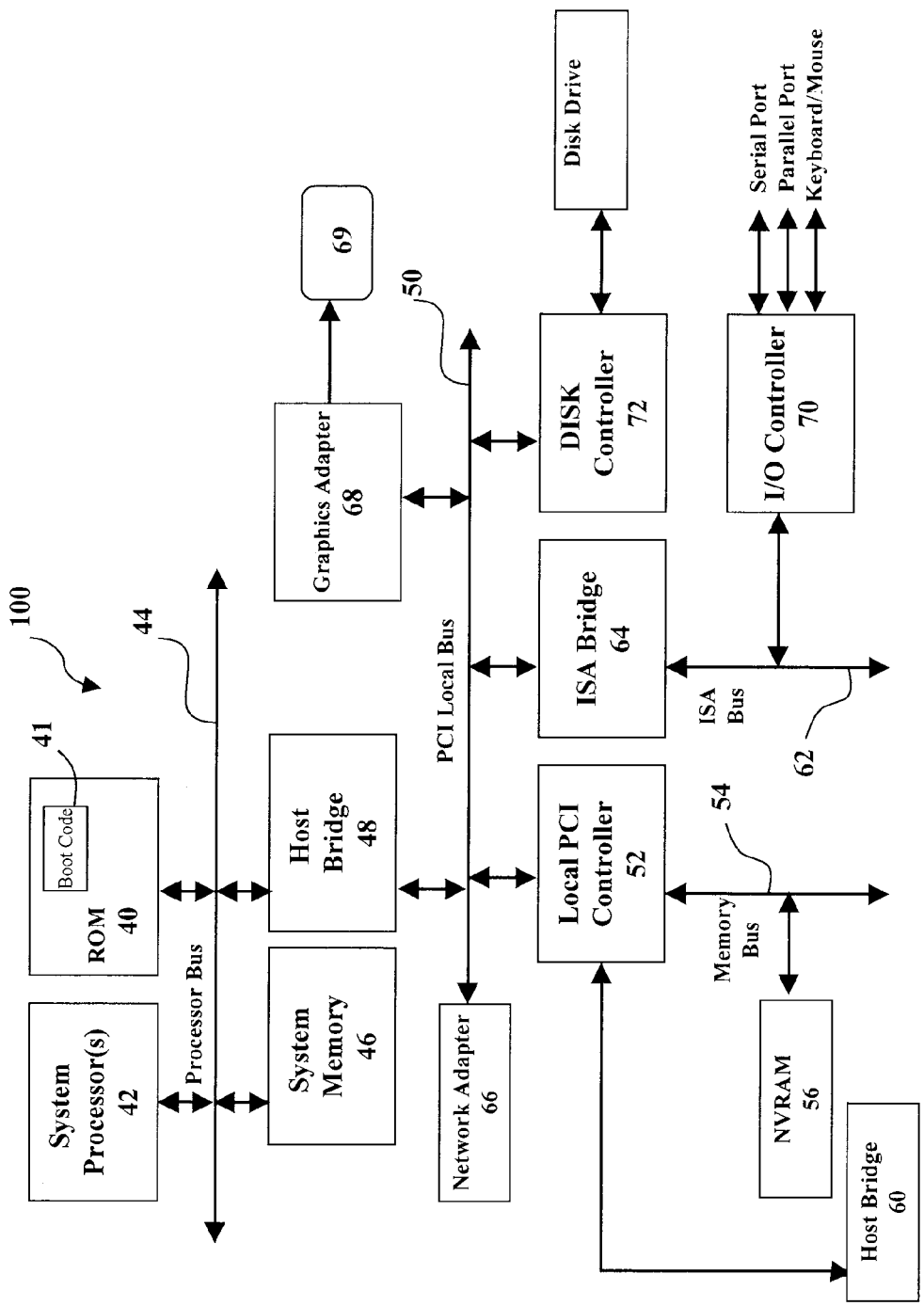
FIG. 1 illustrates a computer system according to an exemplary embodiment.

It will be readily understood that the components of the embodiments of the invention, as generally described and illustrated in the figures herein, may be arranged and designed in a wide variety of different configurations in addition to the described exemplary embodiments. Thus, the following more detailed description of the embodiments of the present invention, as represented in the figures, is not intended to limit the scope of the embodiments of the invention, as claimed, but is merely representative of selected exemplary embodiments of the invention.

Reference throughout this specification to "one embodiment" or "an embodiment" (or the like) means that a particular feature, structure, or characteristic described in connection with the embodiment is included in at least one embodiment of the present invention. Thus, appearances of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments of the invention. One skilled in the relevant art will recognize, however, that aspects of the invention can be practiced without one or more of the specific details, or with other methods, components, materials, etc. In other instances, well-known structures, materials, or operations are not shown or described in detail to avoid obscuring aspects of the invention. For example, herein exemplary use cases of managing sound options of certain applications of certain computer systems and certain types of displays are presented, specifically involving a laptop or desktop PC. However, these exemplary applications, computer systems and display types described herein are simply utilized to highlight certain aspects of the invention. It will be readily understood that embodiments of the invention can be implemented utilizing other types of computer systems and/or different display devices.

Managing sound options of computer applications is of interest in various contexts. For example, a user making a presentation using an application program (for example, a PowerPoint® presentation graphics program slide show) from his or her laptop PC to an audience on a conference room display screen will also have many other noise-generating applications running on the laptop PC. (Throughout this disclosure, "screen", "display" and "display device" are used interchangeably). For example, the laptop PC may have applications such as instant messaging, e-mail, web browser, et cetera running at the same time as the presentation. Just as the audience should not see these other applications, the audience likewise should not hear the noises made by these other applications. PowerPoint® is either a registered trademark or trademark of Microsoft Corporation in the United States and/or other countries.

In Windows Vista® and Windows® 7 operating systems, as non-limiting examples, it is possible to set the volume for each application separately. Moreover, where multiple audio outputs are available, it is also possible to target each application's sound to a specific output. Unfortunately, the inventors have recognized that configuring the system this way is difficult and time consuming, and therefore most users choose to simply mute all sound, or leave the system as-is (that is, with sound enabled to all applications) and hope unexpected sounds do not occur. Windows Vista® and Windows® 7 are either registered trademarks or trademarks of Microsoft Corporation in the United States and/or other countries.

Accordingly, embodiments of the invention broadly provide improvements to sound management options, specifically providing for application sound management in a screen or display type dependent format. Thus, applications can have their sound characteristics (which can include but are not necessarily limited to volume and equalization parameters) dictated based on the display characteristics, as for example detected by the computer system running the application(s). Various features, described in further detail herein, offered by various embodiments of the invention can be broadly placed in two general categories.

First, embodiments of the invention categorize screens. For example, an embodiment of the invention is configured to designate a screen as the primary or presenting screen, such as in a Windows® 7 operating system projector settings environment. According to embodiments of the invention, applications with their root window, full-screen window, or any window on the primary or presenting screen will operate according to a first sound setting or profile (for example, be permitted to emit sound at a certain volume level). Applications not on the primary or presenting screen will operate according to a second sound setting or profile (for example, be muted or emit sound at a reduced volume).

Second, embodiments of the invention are configured to permit a user to select one or more sound profiles (having one or more sound characteristics, for example, volume) and one or more output devices for each screen. Thus, once a screen has been configured with a sound profile, if an application is dragged (or otherwise displaced) from one screen to another, that application's sound profile and sound output device would change to new (screen-specific) settings. The change can be detected and triggered in any one of a number of ways, for example when about 51% (or some predetermined percentage or value) of the application window is displayed on the new screen. Where multiple sound outputs are available, each output may be assigned a sound characteristic (for example, volume) modifier level for each screen. Thus, applications with a sound-generating window on a given screen will have their volume level automatically adjusted for the screen on which it currently resides.

The illustrated embodiments of the invention will be best understood by reference to the Figures. The following description is intended only by way of example, and simply illustrates certain exemplary embodiments of the invention.

Referring now to FIG. 1, there is depicted a block diagram of an illustrative embodiment of a computer system 100. The illustrative embodiment depicted in FIG. 1 may be a notebook or laptop PC computer system, such as one of the ThinkPad® series of personal computers sold by Lenovo (US) Inc. of Morrisville, N.C. As will become apparent from the following description, however, embodiments of the invention are applicable to operation by any appropriately configured data processing system or other electronic device, including but not limited to media management systems, mobile computing devices, such as personal digital assistants (PDAs), smart/mobile phones, et cetera, and the like.

As shown in FIG. 1, computer system 100 includes at least one system processor 42, which is coupled to a Read-Only Memory (ROM) 40 and a system memory 46 by a processor bus 44. System processor 42, which may comprise one of the AMD™ line of processors produced by AMD Corporation or a processor produced by Intel Corporation, is a general-purpose processor that executes boot code 41 stored within ROM 40 at power-on and thereafter processes data under the control of operating system and application software stored in system memory 46. System processor 42 is coupled via processor bus 44 and host bridge 48 to Peripheral Component Interconnect (PCI) local bus 50. AMD™ is a trademark of Advanced Micro Devices, Inc.

PCI local bus 50 supports the attachment of a number of devices, including adapters and bridges. Among these devices is network adapter 66, which interfaces computer system 100 to LAN, and graphics adapter 68, which interfaces computer system 100 to display 69. Communication on PCI local bus 50 is governed by local PCI controller 52, which is in turn coupled to non-volatile random access memory (NVRAM) 56 via memory bus 54. Local PCI controller 52 can be coupled to additional buses and devices via a second host bridge 60.

Computer system 100 further includes Industry Standard Architecture (ISA) bus 62, which is coupled to PCI local bus 50 by ISA bridge 64. Coupled to ISA bus 62 is an input/output (I/O) controller 70, which controls communication between computer system 100 and attached peripheral devices such as a keyboard, mouse, et cetera. In addition, I/O controller 70 supports external communication by computer system 100 via serial and parallel ports. The USB Bus and USB Controller (not shown) are part of the Local PCI controller (52). Moreover the computer system 100 can be operatively connected to one or more audio devices (refer to FIG. 2).

Figure 2:
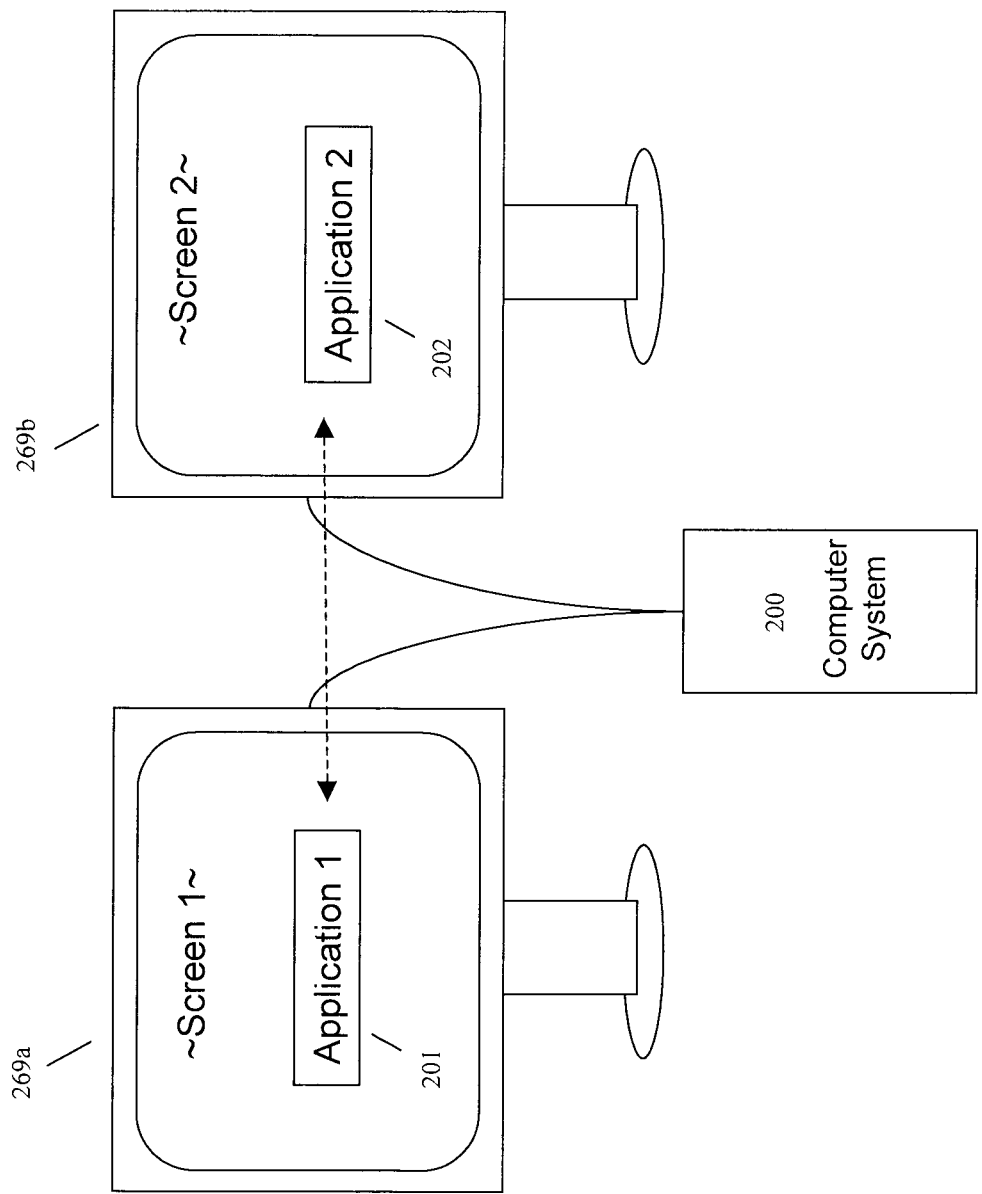
FIG. 2 illustrates a computer system operatively connected to two display screens according to an exemplary embodiment.

Turning to FIG. 2, a system for managing sound characteristics of application(s) according to an embodiment of the invention is illustrated. A computer system 200, such as computer system 100 described above, is operatively connected to a plurality of display devices 269a, 269b (each having, for example, a built in sound device). Again, the illustrated computer system 200 is a desktop computer operatively connected to two display devices (screens); however, the computer system 200 may be any of a variety of computer systems, such as a laptop computer having a main display screen and being operatively connected to an auxiliary display screen, such as that of a projection system, or a media management system operably connected via a local network to a laptop or mobile computing device with a display. Also, the computer system 200 can be connected to any number of display devices, from a single display device to more than two display devices of a wide variety of types, including an HDTV; however, for simplicity two display devices 269a, 269b are shown as connected to computer system 200.

The computer system 200 can operate essentially any number of applications at the same time. These applications can be displayed in different display devices. Illustrated are two applications ("Application 1", 201, and "Application 2", 202) appearing on separate display devices, 269a, 269b, respectively. Under normal circumstances, it is possible to modify a sound characteristic, for example volume, of application 201 separately from application 202. However, it is currently not possible to modify a sound characteristic of an application (either 201 or 202) based on where it is being displayed, that is on 269a or 269b. Thus, moving (for example, dragging) application 201 to display 269b, as in a current extended desktop scenario, will not change the sound characteristic(s) of the applications.

Accordingly, embodiments of the invention provide for modifying one or more sound characteristics of one or more applications (for example, applications 201 and 202) based on display (screen) characteristics. Embodiments of the invention provide for modulating sound characteristics of an application based on its resident display in a myriad of ways, a few non-limiting and exemplary use cases are described herein to highlight aspects of the invention.

Consider for example a use case wherein display device 269a is a local display device and display device 269b is a larger, conference (projector type) display device, both operatively connected to computer system 200, such as a laptop PC. A user may wish to keep certain applications (for example, application 201 may be an instant messaging application) up and running on display 269a while simultaneously presenting another application (for example, application 202 may be a PowerPoint® presentation) to an audience on display 269b. However, the user may wish to mute application 201 while permitting application 202 to produce sound (for example, throughout the presentation). Embodiments of the invention permit such modification of sound characteristics dependent upon display type/location. For example, an embodiment of the invention first detects a display device type, and thereafter applies a predetermined sound profile to any application(s) output to that display device. Accordingly, a user may mute a local display device (in this example, 269a), while simultaneously enabling sound in any auxiliary display device detected (for example, detected upon connecting the conference display device to the computer system 200 (in this example, 269b)). As another example, the user may manually set a sound profile for the local display device (269a, for example mute), and manually set another sound profile for the conference room display device (269b, for example, sound at 50%).

Figure 3:
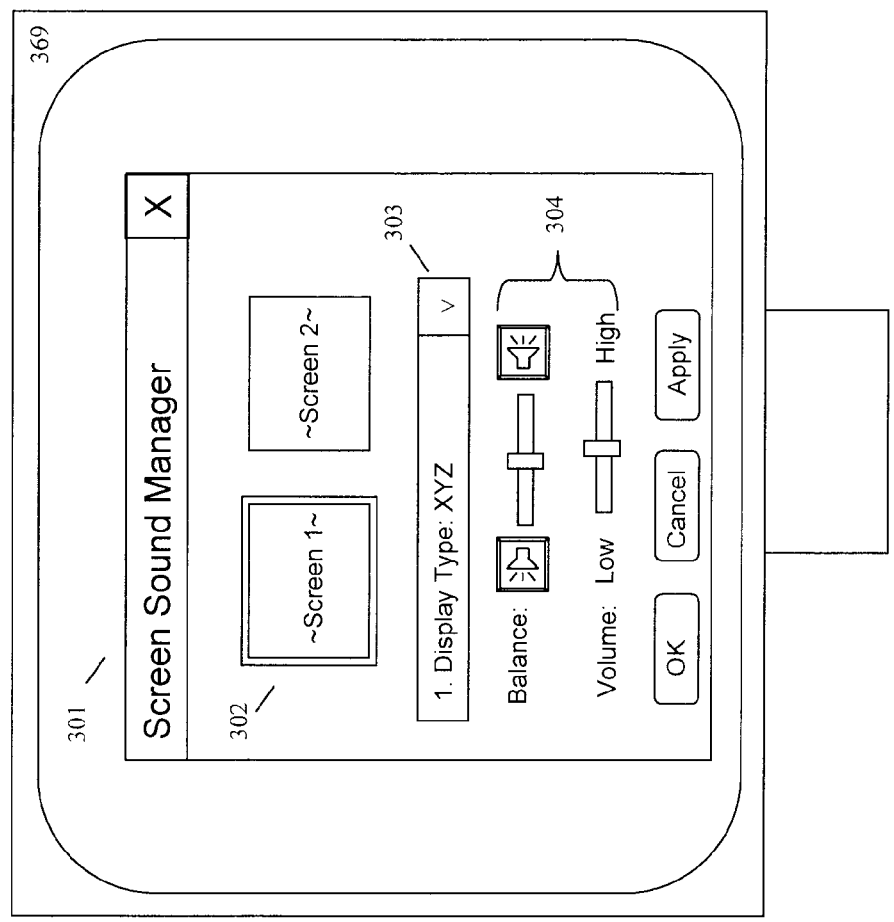
FIG. 3 illustrates a screen sound manager application according to an exemplary embodiment.

Referring to FIG. 3, a user interface for controlling sound characteristics per display device according to an embodiment of the invention is illustrated. As shown, a display device 369 displays a screen sound manager 301 application in a window. In the window, the user can set various sound characteristics for different display devices. The user can select a connected display device in a display device selection part 302 of the window. Once the user selects the display device, which can be indicated in a view 303 with a drop down menu listing available/connected display devices/types, the various sound characteristics to be applied to applications running on that display device (here Screen 1 has been selected) may be modified as desired.

Thus, the user may modify any of a wide variety of sound characteristics for applications appearing on the display screen. In FIG. 3, sound characteristic controller 304 simply shows balance and volume, though any of a number of sound related parameters/characteristics can be included in the sound controller 304 and thus modified as desired (for example, treble, base, et cetera). Thus, embodiments of the invention provide a simple user interface for modifying one or more sound characteristics to be applied to applications appearing/playing on the selected display device. Thus, the user can modulate application sound characteristics without specifically modulating each application sound characteristic. Rather, the sound characteristics (sound profile) set for the display device will be applied to all applications appearing on the display device. It should be noted that an application is determined to appear on a display device in any number of ways, including for example an application simply being placed in the display device, or more complex scenarios such as having its application window maximized on the display device, having the mouse cursor placed over its application window on the display device, et cetera. Accordingly, once the user has configured the display device with a sound profile, any application's sound profile/characteristics can be modified by simply through a drag operation of the application to a different screen/display device (having a different sound profile).

Figure 4:
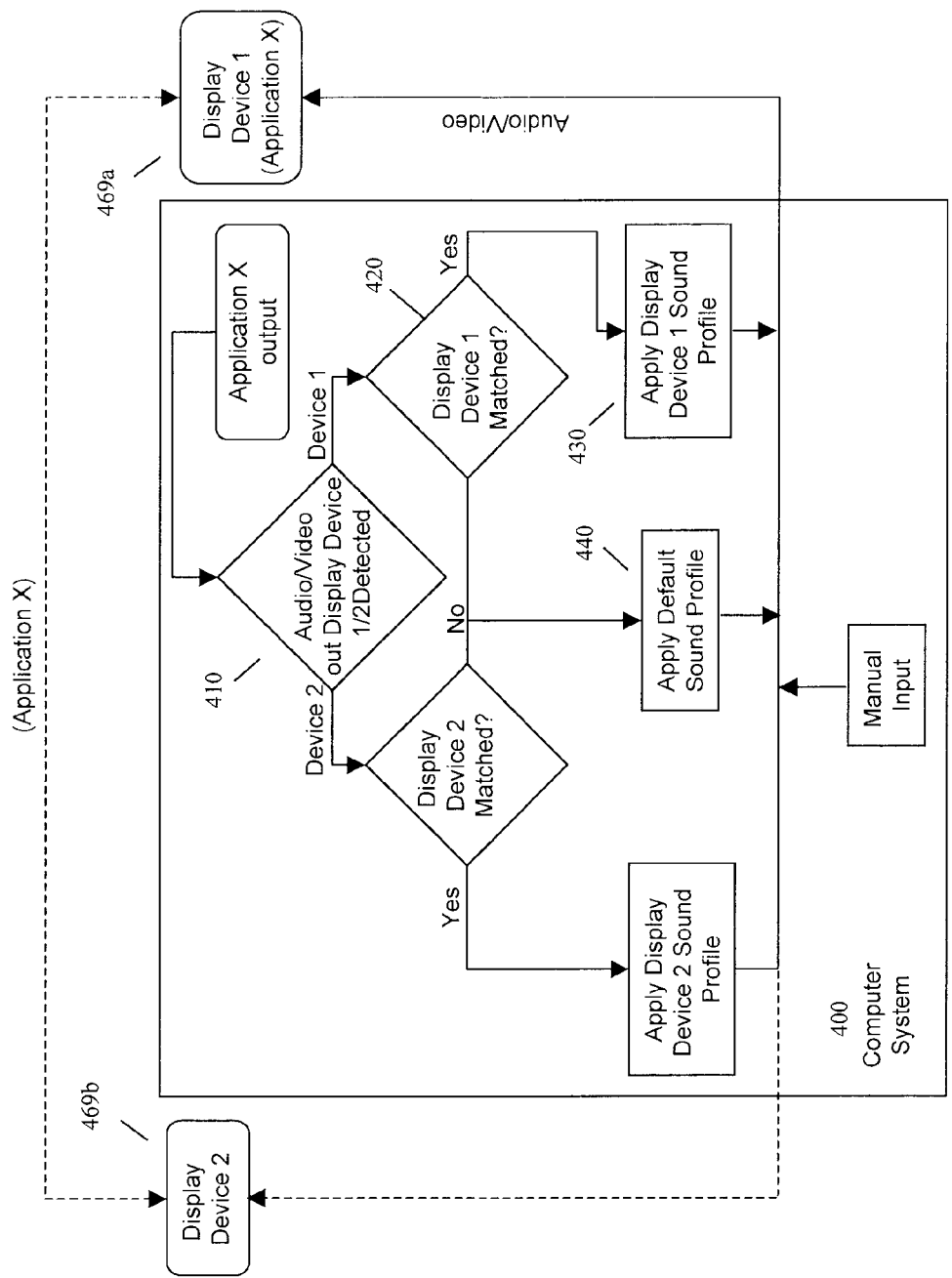
FIG. 4 illustrates display device dependent application sound management according to an exemplary embodiment.

Turning to FIG. 4, an exemplary flow chart illustrates sound management for an application according to an embodiment of the invention. Here, it is assumed that different sound profiles have been set for the different display devices (469a, 469b). These profiles can be either pre-set for a specific type of display (for example, display device model, location (logical or physical), refresh rate, HDCP support, or any identifying characteristic for the display device) and/or set/modified manually for each display, using screen sound manager application, as discussed in connection with FIG. 3.

Accordingly, when an application ("Application X" in this example) runs on a display device (Display Device 1 (469a) in this example), the application output from the computer system 400 to the display device is detected as being directed to a particular display device at 410. Here, the output is directed to Display Device 1 (469a). At 420, it is determined if Display Device 1 has a sound profile match. If yes, the sound profile is applied and the output is modified as appropriate at 430. For example, Display Device 1 sound profile may dictate muted sound. Thus, only video output is supplied to Display Device 1 (469a). If no sound profile is set for Display Device 1, a default profile may be utilized 440 (in which case the output proceeds uninterrupted according to the default system settings).

As noted previously, Application X may have its sound profile changed merely by the application being repositioned on another display screen, such as Display Device 2 (469b). In response to Application X being moved to Display Device 2, the application's output can again be modified, similar to the scenario outlined for Display Device 1 (469a). Determining when Application X has been moved to another display device such that the new sound profile should be applied could be implemented in a variety of ways, as described herein, for example when a predetermined percentage (for example >50%) of the application's window appears on the other display device.

In brief recapitulation, embodiments of the invention provide sound modification of applications dependent upon display device characteristics. The display device characteristics can be any of a wide variety of characteristics, including but not limited to location of the display device, display device type, make, manufacture, et cetera. Thus, the sound profile can be default-matched to a particular display device type. Also, the user via the user interface (for example, screen sound manager in FIG. 3) can easily modify these default settings.

It should be noted that although exemplary embodiments have been discussed herein with reference to a desktop and/or laptop PC outputting audio/video data to two or more display devices, it should be understood that embodiments of the invention can be advantageously implemented using many different computing devices in many different contexts. These different computing devices/contexts may include but are not limited to media management systems wherein application sound settings/profiles are applied based on the display device characteristics and/or on the characteristics of the systems originating the audio video data (that is, different sound profiles applied based on the computing system providing the audio/video data). [Not sure how much switch box related implementation details we want to include in this one]

It should also be noted that aspects of the invention may be embodied as a system, method or computer program product. Accordingly, aspects of the invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the invention may be written in any combination of one or more programming languages, including an object oriented programming language such as Java®, Smalltalk, C++ or the like and conventional procedural programming languages, such as the "C" programming language or similar programming languages. The program code may execute entirely on the user's computer (device), partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

This disclosure has been presented for purposes of illustration and description but is not intended to be exhaustive or limiting. Many modifications and variations will be apparent to those of ordinary skill in the art. The embodiments were chosen and described in order to explain principles and practical application, and to enable others of ordinary skill in the art to understand the disclosure for various embodiments with various modifications as are suited to the particular use contemplated.

Although illustrative embodiments of the invention have been described herein with reference to the accompanying drawings, it is to be understood that the embodiments of the invention are not limited to those precise embodiments, and that various other changes and modifications may be affected therein by one skilled in the art without departing from the scope or spirit of the disclosure.

What is claimed is:

1. An apparatus comprising:
   one or more processors; and
   a program storage device tangibly embodying a program of instructions executable by the one or more processors, the program of instructions comprising:
   computer readable program code configured to provide two or more sound profiles for one user application running on the apparatus; and
   computer readable program code configured to apply different sound profiles to the one user application based on output to different display devices.

2. The apparatus according to claim 1, wherein two one or more sound profiles are applied to the one user application running on the apparatus based on a display device assignment for the one user application.

3. The apparatus according to claim 2, wherein the display device assignment for the one user application comprises a display device location for display of the one user application.

4. The apparatus according to claim 1, wherein the computer readable program code configured to apply two or more sound profiles is further configured to apply a sound profile based on one or more of a user selection, and a display device characteristic.

5. The apparatus according to claim 4, wherein the display device characteristic is selected from the group consisting of a display device location, a display device type, a display device identification, and a display device resolution.

6. The apparatus according to claim 1, wherein the program of instructions further comprises:
    computer readable program code configured to change a sound profile assigned to one of the one user application in response to a change in application display device assignment.

7. The apparatus according to claim 6, wherein the computer readable program code configured to change a sound profile assigned to the one user application in response to a change in application display device assignment is further configured to:
    detect that a predetermined percentage of a display window containing a display of the one user application resides on a new display device; and
    change the sound profile assigned to the one user application in response to detecting that the predetermined percentage of the display window resides on the new display device.

8. The apparatus according to claim 1, wherein the two or more sound profiles comprise settings for one or more sound characteristics.

9. The apparatus according to claim 8, wherein the one or more sound characteristics comprise a volume level.

10. The apparatus according to claim 1, wherein the program of instructions further comprises:
    computer readable program code configured to provide a user interface for modifying the two or more sound profiles.

11. A method comprising:
    utilizing one or more processors of an apparatus to execute a program of instructions tangibly embodied on one or more program storage devices, the program of instructions comprising:
    computer readable program code configured to provide two or more sound profiles for one user application running on the apparatus; and
    computer readable program code configured to apply the different sound profiles to the one user application based on output to different display devices.

12. The method according to claim 11, wherein the two or more sound profiles are applied to the one user application running on the apparatus based on a display device assignment for the one user application.

13. The method according to claim 12, wherein the display device assignment for the one user application comprises a display device location for display of the one user application.

14. The method according to claim 11, wherein the computer readable program code configured to apply two or more sound profiles is further configured to apply a sound profile based on one or more of a user selection, and a display device characteristic.

15. The method according to claim 14, wherein the display device characteristic is selected from the group consisting of a display device location, a display device type, a display device identification, and a display device resolution.

16. The method according to claim 11, wherein the program of instructions further comprises:
    computer readable program code configured to change a sound profile assigned to one of the one user application in response to a change in application display device assignment.

17. The method according to claim 16, wherein the computer readable program code configured to change a sound profile assigned to the one user application in response to a change in application display device assignment is further configured to:
    detect that a predetermined percentage of a display window containing a display of the application resides on a new display device; and
    change the sound profile assigned to the one user application in response to detecting that the predetermined percentage of the display window resides on the new display device.

18. The method according to claim 11, wherein:
    the two or more sound profiles comprise settings for one or more sound characteristics; and
    the one or more sound characteristics comprise a volume level.

19. The method according to claim 18, wherein the program of instructions further comprises:
    computer readable program code configured to provide a user interface for modifying the two or more sound profiles.

20. A computer program product comprising:
    a computer readable storage medium having computer readable program code embodied therewith, the computer readable program code comprising:
    computer readable program code configured to provide two or more sound profiles for one user application running on an apparatus; and
    computer readable program code configured to apply different sound profiles to one user application based on output to different display devices.

* * * * *